J. R. MORRIS.
Furnace.

No. 101,965.

Patented April 12, 1870.

Witnesses:
J. W. Coombs.
A. S. Spencer.

Inventor:
R. Morris.
per Munn & Co.
Attys.

United States Patent Office.

JOSEPH R. MORRIS, OF HOUSTON, TEXAS.

*Letters Patent No. 101,965, dated April 12, 1870; granted for 25 years, 10 months, and 4 days, from June 8, 1861.*

---

IMPROVEMENT IN FURNACES.

---

The Schedule referred to in these Letters Patent and making part of the same.

---

*To all whom it may concern:*

Be it known that I, JOSEPH R. MORRIS, of Houston, in the county of Harris and State of Texs, have invented a new and useful Improvement in Furnaces; and I do hereby declare that the following is a full, clear, and exact description of the same, reference being had to the accompanying drawings forming part of this specification, in which—

Similar letters of reference in both views indicate corresponding parts.

Figure 1:
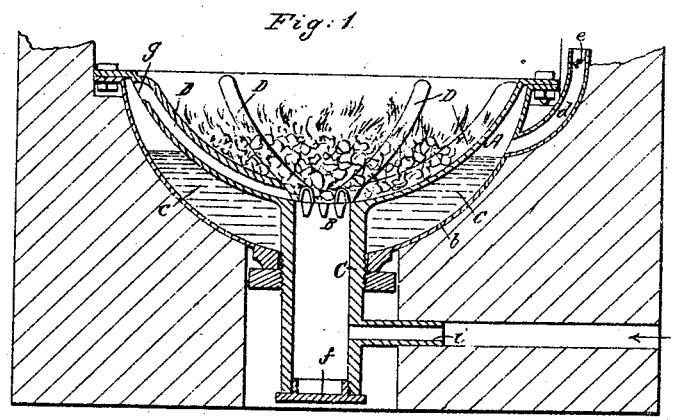
Figure 1 represents a vertical central section of my invention.
Figure 2:
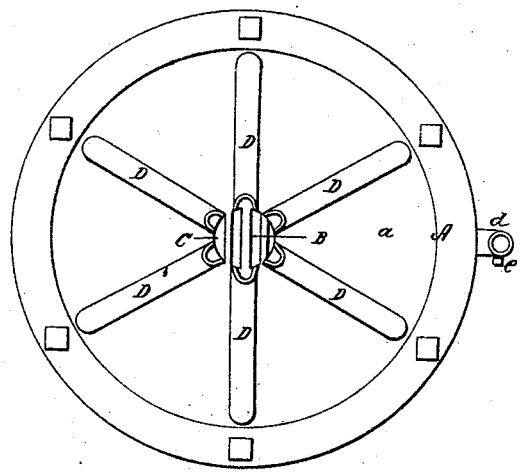
Figure 2 is a plan or top view of the same.

This invention consists in the arrangement of a series of iron tubes or channels leading from a water-space, connected with the furnace, down to the fire-place in such a manner that the steam, formed by the action of the heat of the fire on the water in the water space of the furnace, passes through said tubes down into the fire, and that said steam, by coming in contact with the red-hot sides of said tubes or channels, is decomposed, and, by the free hydrogen gas thus formed and brought in contact with the heated air passing up through the fire, a more intense heat is effected than with ordinary furnaces.

To enable those skilled in the art to make and use my invention, I will proceed to describe its construction and operation, with reference to the drawing.

The furnace A is constructed in the shape of a hollow hemisphere with double walls $a$ $b$, and the space $c$ between the two walls is partially filled with water, as clearly shown in fig. 1 of the drawing.

The water is introduced through a short pipe, $d$, which can be closed by a cock or valve, $e$.

The center of this furnace is occupied by the grate B, which is inserted into the mouth of the tube C that extends from the inner wall $a$ through outer wall $b$, and down into the brick wall, which is to support the furnace.

The lower end of this tube is closed by a cap, $f$, by removing which the ashes and dust that may accumulate in the bottom of said tube can be removed.

The upper part of the water-space $c$ communicates, through openings $g$, with a series of channels D which is arranged on the inner side of the inner wall $a$ of the furnace.

These channels are open at the bottom, and they terminate in close proximity to the gate B.

The sides of these channels ought to be made of iron or some other material, which, when heated to red heat, is capable of decomposing steam or vapor of water that may be brought in contact with it.

The fire in the furnace is supplied with the requisite amount of atmospheric air through a pipe, $i$, that is intended to communicate with a suitable blowing apparatus.

The operation is as follows:

After the water-space has been filled with water, and the stop-valve $e$ in the pipe $d$ is closed, a fire is built on the grate B in the center of the furnace. By the action of the heat, the water forms into steam, which, having no other way to escape, passes through the channels D down into the fire.

The sides of these channels, which are to be made of iron or some other material capable of decomposing steam, are heated to red heat by the action of the fire in the furnace, and as the steam in passing through said channels, comes in contact with the red-hot iron, it is decomposed, the oxygen being retained by the iron, and the hydrogen passes off into the fire, and in coming in contact with the atmospheric air forced in through the pipes $i$, ignites and increases the heat of the fire. By these means a much more intense heat can be effected with the same quantity of fuel than by a furnace of the ordinary construction.

Having thus described my invention,

What I claim as new, and desire to secure by Letters Patent, is—

The arrangement of the channels D of iron or some other suitable material, in combination with the water-space $c$ surrounding the furnace A, and communicating with the same through openings $g$, the whole being constructed and operating substantially as and for the purpose described.

J. R. MORRIS.

Witnesses:
G. W. CAPRON,
ANDREW S. MAIR.